United States Patent
Barr et al.

(10) Patent No.: US 6,827,372 B2
(45) Date of Patent: Dec. 7, 2004

(54) MUD FLAP HANGER SYSTEM

(75) Inventors: Graylin Patrick Barr, Fresno, CA (US); William Michael Betts, III, Piedmont, CA (US); William Michael Betts, IV, Piedmont, CA (US); Gordon Ray Glenn, Fresno, CA (US)

(73) Assignee: Betts Spring Company, Fresno, CA (US)

( * ) Notice: Subject to any disclaimer, the term of this patent is extended or adjusted under 35 U.S.C. 154(b) by 0 days.

(21) Appl. No.: 10/346,307

(22) Filed: Jan. 16, 2003

(65) Prior Publication Data

US 2004/0140663 A1 Jul. 22, 2004

(51) Int. Cl.⁷ .............................................. B62D 25/18
(52) U.S. Cl. ...................... 280/847; 280/848; 280/851; 280/154; 280/152.3
(58) Field of Search .................................... 280/847, 848, 280/851, 154, 152.3; D12/184, 185; 298/1 SG

(56) References Cited

U.S. PATENT DOCUMENTS

| | | | | |
|---|---|---|---|---|
| 1,795,366 A | * | 3/1931 | Hardy | ........................ 280/851 |
| 2,652,266 A | | 9/1953 | Miller | |
| 2,865,655 A | * | 12/1958 | Boysen | ........................ 280/851 |
| 2,970,849 A | * | 2/1961 | Betts | ........................ 280/851 |
| 3,095,215 A | * | 6/1963 | Black | ........................ 280/851 |
| 3,237,963 A | * | 3/1966 | Menzer | ...................... 280/851 |
| 3,388,884 A | * | 6/1968 | Eggler et al. | .......... 248/222.11 |
| 3,549,171 A | * | 12/1970 | Katz | .......................... 280/851 |
| 3,700,260 A | | 10/1972 | Moore et al. | |
| 3,782,757 A | * | 1/1974 | Juergens | ..................... 280/851 |
| 3,999,776 A | | 12/1976 | Betts, Sr. | |
| 4,007,944 A | * | 2/1977 | Dingess | ...................... 280/851 |
| 4,354,690 A | * | 10/1982 | Hanson | ...................... 280/851 |
| 4,629,204 A | * | 12/1986 | Arenhold | .................... 280/851 |
| 5,823,571 A | | 10/1998 | Cominsky | |
| 5,967,553 A | | 10/1999 | Cominsky | |
| 6,116,628 A | | 9/2000 | Adrian | |

FOREIGN PATENT DOCUMENTS

EP 0160112 A1 11/1985

* cited by examiner

Primary Examiner—Christopher P. Ellis
Assistant Examiner—G B Klebe
(74) Attorney, Agent, or Firm—Thomas R. Lampe

(57) ABSTRACT

A mud flap assembly includes a vehicle attachment bracket and an elongated support member of integral construction from which a mud flap depends extending outwardly from the attachment bracket. The elongated support member is inflexible in up and down directions and flexible in forward and rearward directions. The support member is positioned in a channel formed in the mud flap.

17 Claims, 4 Drawing Sheets

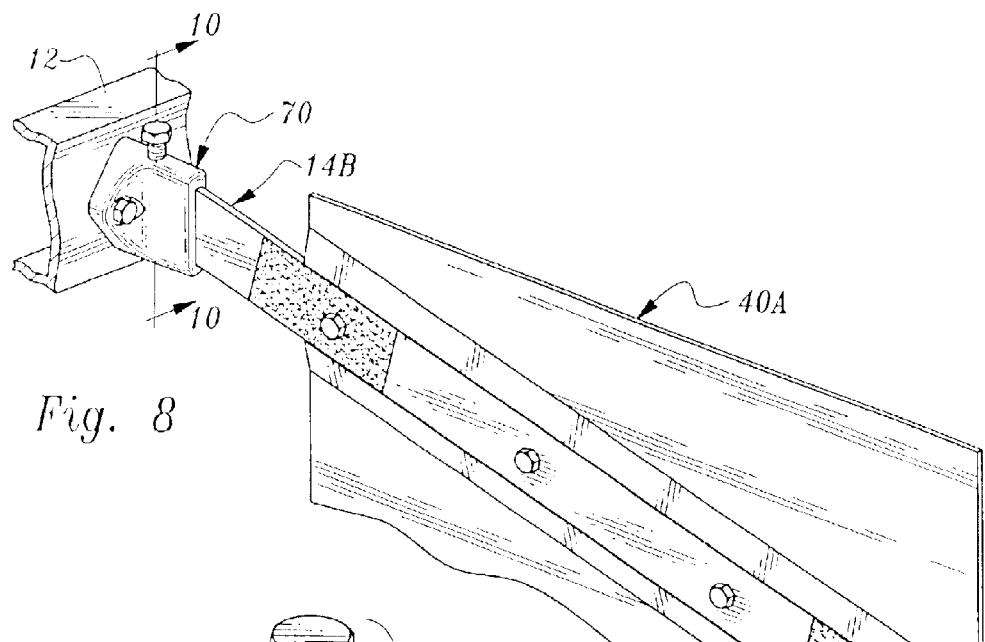
Fig. 8
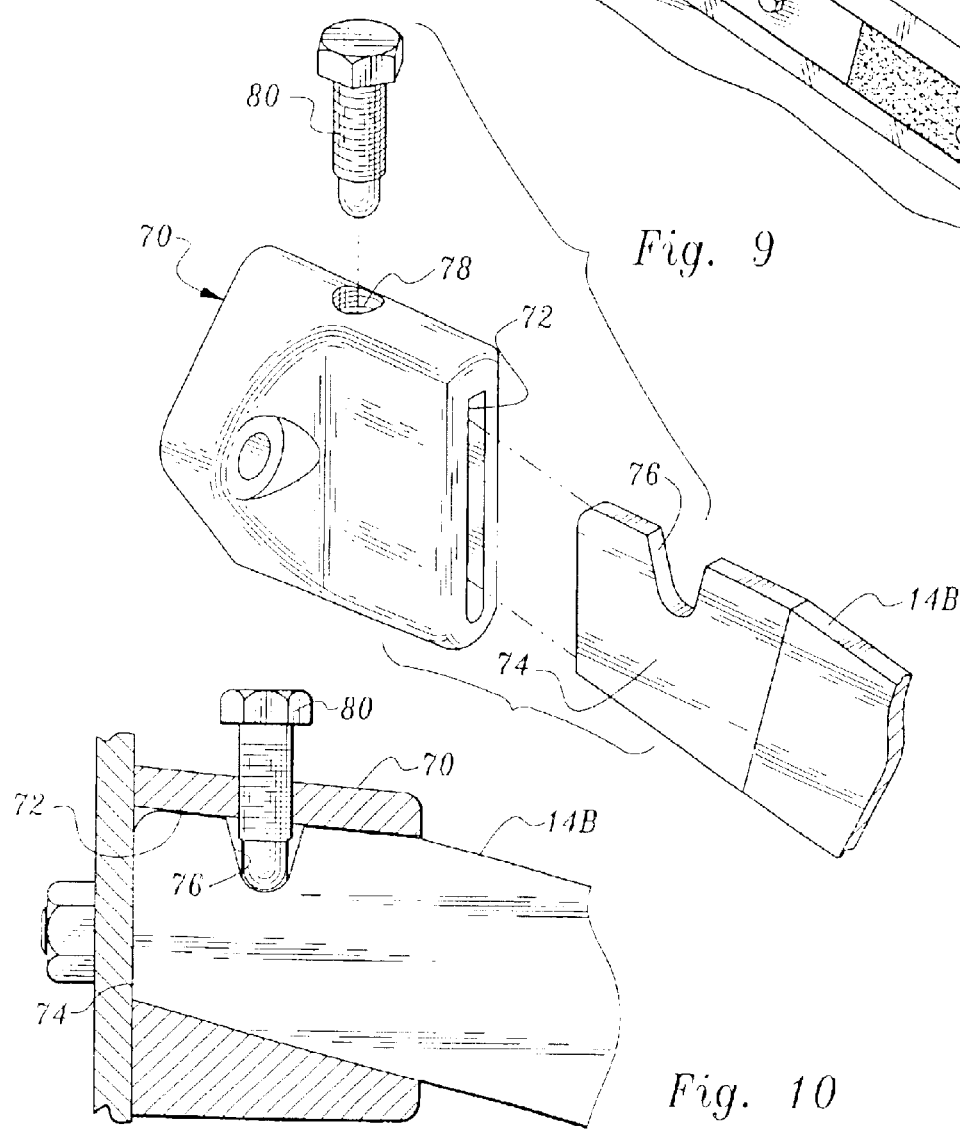
Fig. 9
Fig. 10

_US 6,827,372 B2_

MUD FLAP HANGER SYSTEM

TECHNICAL FIELD

This invention relates to a mud flap holder system employable with trucks and other types of vehicles.

BACKGROUND OF THE INVENTION

It is well known to employ mud flaps on trucks and other vehicles. Typically, mud flaps are employed with hangers attached to the frame or other structure of the vehicle. It is also known to connect the flaps directly to vehicle frames. With regard to the former approach, mud flap holders or hangers are essentially of two types, the first being structure rigidly interconnecting the flap to the vehicle and structure incorporating spring biasing means for allowing deflection of at least part of the structure and the flap responsive to outside forces. By allowing such deflection, breakage due to impact is eliminated or at least substantially reduced.

Spring-biased flap hanger structures or mechanisms can be relatively expensive and springs or other components of the hanger structures may need replacement on a periodic basis due to corrosion, impacts, etc. In addition, at least some of these spring-based arrangements can be difficult and/or time consuming to install. Furthermore, dirt and wear can cause misalignment of the flap and holder.

The following patents are believed to be representative of the current state of the prior art in this field: U.S. Pat. No. 6,116,628, issued Sep. 12, 2000, U.S. Pat. No. 5,823,571, issued Oct. 20, 1998, U.S. Pat. No. 5,967,553, issued Oct. 19, 1999, U.S. Pat. No. 3,999,776, issued Dec. 28, 1976, U.S. Pat. No. 3,700,260, issued Oct. 24, 1972, U.S. Pat. No. 2,652,266, issued Sep. 15, 1953, and European Patent Application No. EP 0 160 112A1.

The prior art does not teach or suggest the combination of structural elements disclosed and claimed herein.

DISCLOSURE OF INVENTION

The present invention relates to a mud flap assembly system incorporating several components which cooperate in a unique manner to provide an arrangement that is relatively simple and inexpensive while at the same time provides numerous advantages, such as flexibility in forward and rearward directions without the use of springs or other external biasing means. The arrangement is also characterized by its reliability and durability. Other advantages are discussed below.

The mud flap assembly of this invention is for attachment to trucks or other vehicles.

The mud flap assembly includes an attachment bracket for attaching the mud flap assembly to a vehicle and an elongated support member of integral construction extending outwardly from the attachment bracket.

The elongated support member has a first support member end affixed to the attachment bracket and a second support member end. The elongated support member is substantially inflexible in up and down directions and flexible in forward and rearward directions. The second support member end is free to move either forwardly or rearwardly upon flexing of the elongated support member.

The assembly also incorporates a mud flap of unique character attached to the elongated support member, supported by the elongated support member, and extending downwardly from the elongated support member. The mud flap flexes along with the elongated support member when the elongated support member flexes either forwardly or rearwardly.

Other features, advantages and objects of the present invention will become apparent with reference to the following description and accompanying drawings.

BRIEF DESCRIPTION OF DRAWINGS

FIG. 8 is a perspective view of a third embodiment of mud flap assembly constructed in accordance with the teachings of the present invention;

FIG. 9 is an exploded view illustrating the attachment bracket and end of the elongated support member of FIG. 8 prior to engagement and interconnection thereof by means of a threaded fastener;

FIG. 10 is an enlarged, cross-sectional view taken along the line 10—10 in FIG. 8;

MODES FOR CARRYING OUT THE INVENTION

Referring now to FIGS. 1–5, a mud flap assembly constructed in accordance with the teachings of the present invention includes an attachment bracket 10 secured to the frame 12 of a truck. Extending outwardly from attachment bracket 10 is an elongated support member 14. The member 14 is a metal blade-like member of integral construction having a height substantially exceeding the width thereof. For example, the member 14 utilized with a truck may be formed of spring steel with a thickness of approximately 0.225 in., a height of approximately 2.25 in. and a length of approximately 30 in. Of course, these dimensions are representative only and may be varied as desired, provided however that the elongated support member is substantially inflexible in up and down directions and flexible in forward and rearward directions. Suitable materials other than spring steel may be employed to construct the elongated support member.

Figure 4:
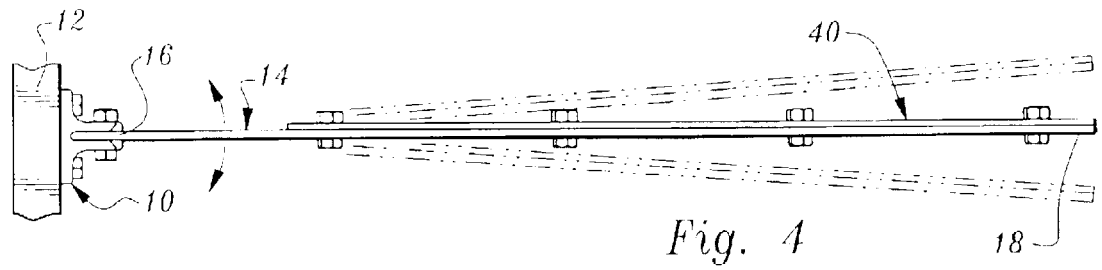
FIG. 4 is a top plan view of the assembly and illustrating the ability of the elongated support member and mud flap thereof to flex in forward and rearward directions, a representative forward displacement and a representative rearward displacement being illustrated by dash lines.

The member 14 has one end 16 thereof affixed to the attachment bracket while the other end, distal end 18 thereof, is free to move either forwardly or rearwardly upon flexing of the elongated support member. This action is illustrated in FIG. 4.

The elongated support member 14 extends horizontally from the attachment bracket 10. The attachment bracket illustrated is a metal casting and defines a slot 20 receiving support member end 16. The attachment bracket defines holes 22 passing completely therethrough. The holes 22 communicate with slot 20. Holes 24 are formed in end 16 of elongated support member 14 and align with holes 22 when the member 14 is in the slot 20. Threaded bolts 26 are inserted through the aligned holes 22, 24 and nuts 28 cooperate with the bolts to secure the elongated support member 14 in position.

Figure 3:
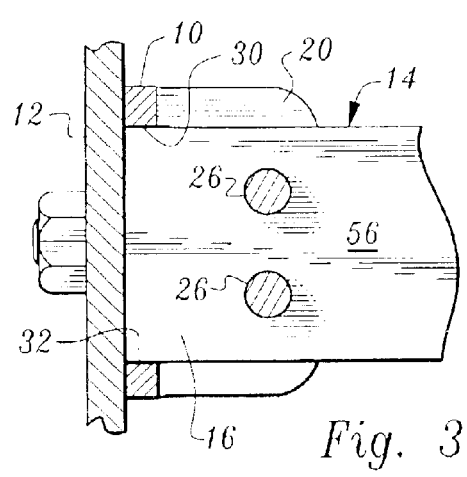
FIG. 3 is an enlarged, cross-sectional view taken along the line 3—3 in FIG. 1.

With reference to FIG. 3, it should be noted that slot 20 does not extend all the way to the top and bottom of the attachment bracket in a portion of the bracket adjoining frame 12. That is, the attachment bracket has an upper abutment surface 30 and a lower abutment surface 32 engaging the elongated support member to provide additional stability.

Elongated support member 14 has a flat outer surface 56 to which are attached two reflective or conspicuity tapes 58. That is, the member provides an integral mounting surface for reflective tape. This feature eliminates the need for a separate component to mount reflectors, as is the common current practice.

Another component of the mud flap assembly of FIGS. 1–5 is a mud flap 40 which may suitably be formed of plastic, rubber or the like. The mud flap 40 defines an elongated recess comprising a continuous channel 42 which extends along one of the two sides thereof between the end walls 44, 46 of the flap. The flap includes two spaced rib elements 48, 50 respectively engaging the top and bottom of the elongated support member 14, member 14 being located in the channel 42 and extending substantially entirely across the flap. The channel 42 is horizontal (parallel to the road surface supporting the truck or other vehicle with which the assembly is associated) and extends parallel to the top surface 52 of the flap and is closely adjacent thereto.

Threaded fasteners 54 in the form of nuts and bolts pass through aligned holes in the flap (in communication with the channel) and elongated support member and are employed with washers 64 to fasten them together. The mud flap extends downwardly from the elongated support member and flexes along with the elongated support member when the elongated support member flexes either forwardly or rearwardly; however, the mud flap does not move up or down due to the inflexibility of the elongated support member 14 in those directions.

Figure 6:
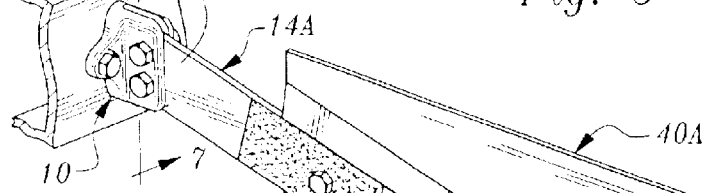
FIG. 6 is a view similar to FIG. 1, but illustrating an alternative embodiment of the invention.
Figure 7:
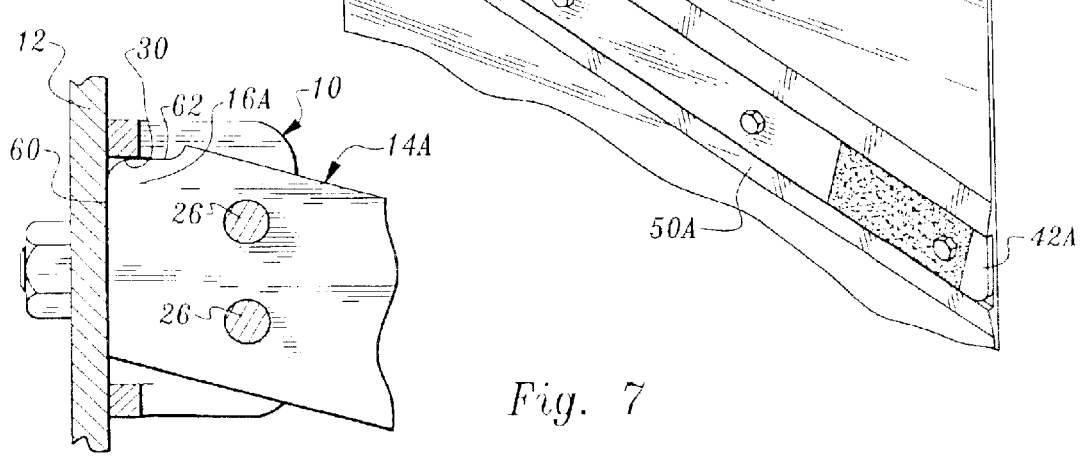
FIG. 7 is an enlarged, cross-sectional view taken along the line 7—7 of FIG. 6.

FIGS. 6 and 7 illustrate another embodiment of the invention. In this embodiment the elongated support member 14A is inclined downwardly relative to attachment bracket 10 and from end 16A. The end 16A has an outer bearing surface 60 which is not orthogonally disposed relative to the major axis of the elongated support member. A notch 62 is formed at the upper portion of the end 16A and abutment surface 30 is positioned in the notch. Stability of the elongated support member 14 is thus provided by the abutting engagement with abutment surface 30 and also the frame 12 of the truck or other vehicle.

Figure 1:
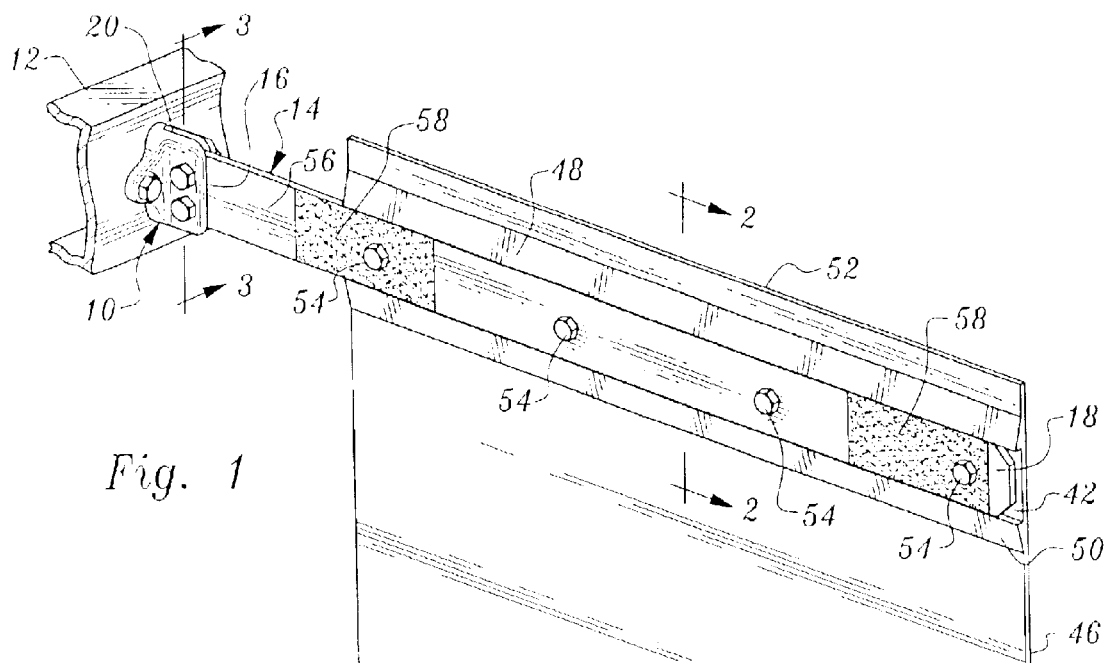
FIG. 1 is a perspective view of a mud flap assembly constructed in accordance with the teachings of the present invention attached to the frame of a vehicle.
Figure 2:
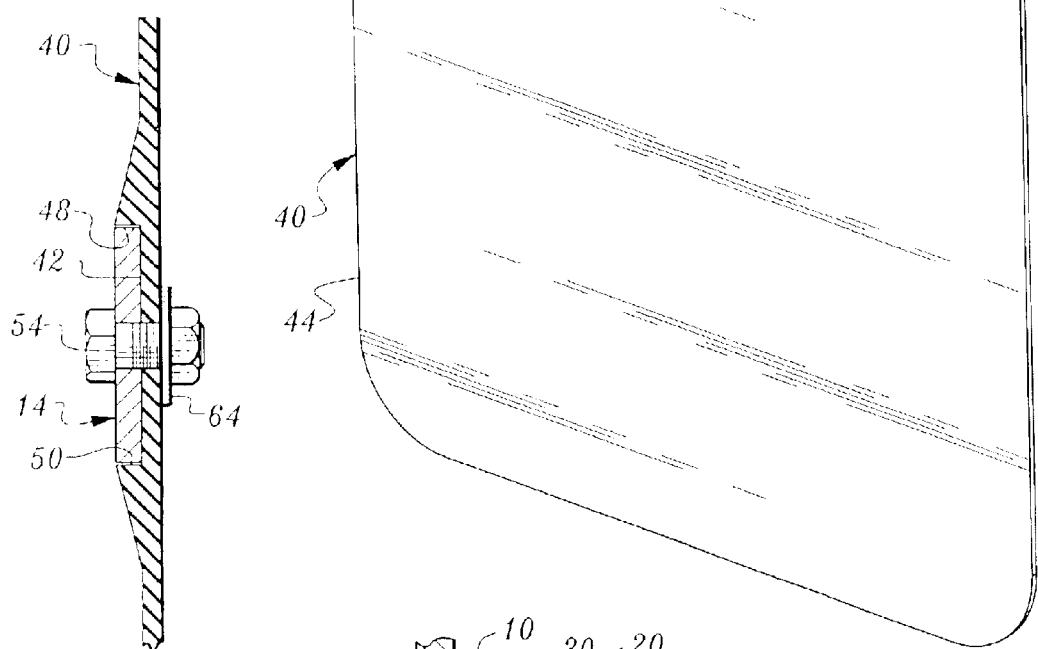
FIG. 2 is an enlarged, cross-sectional view taken along the line 2—2 in FIG. 1.
Figure 5:
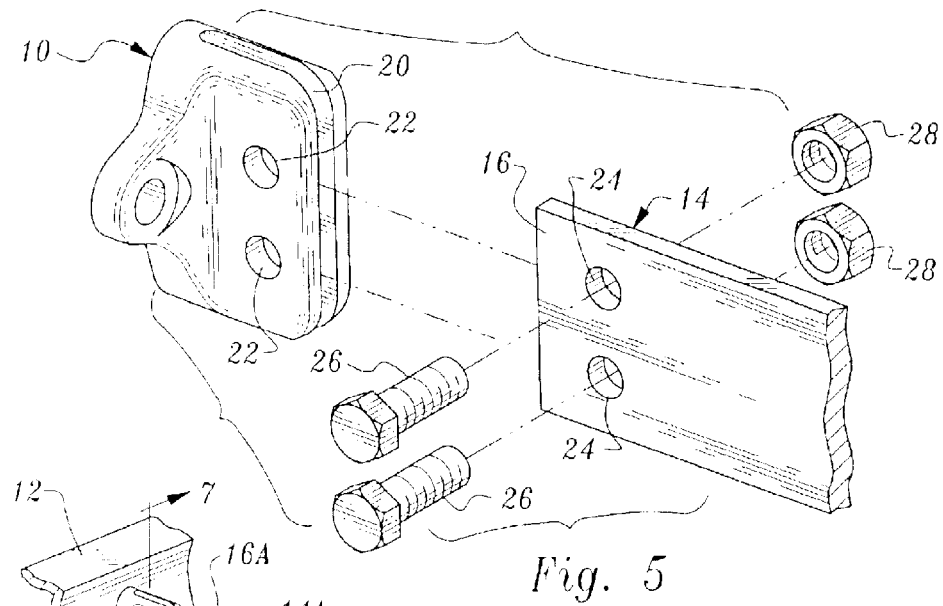
FIG. 5 is an enlarged, perspective, exploded view illustrating the attachment bracket of the assembly, a first support member end and threaded fasteners to be utilized when interconnecting the attachment bracket and elongated support member.

Another difference between this embodiment and that of FIGS. 1 and 5 is that mud flap 40A defines a channel 42A which is inclined relative to the horizontal.

This arrangement provides improved clearance near the truck frame for example to accommodate trailer landing gear, as compared to regular angled style bar-type flap holders. The inclined or sloping blade and inclined channel also contribute to the "anti-sail" aspects of the flap. On a typical truck tractor, wind loads on the flap tend to be greater at the outside edge of the tire. "Sail" of the flap, or deflection by aerodynamic forces, is greatest at the outside edge. This deflection causes the flap to bend upwardly, away from the rod surface, while the vehicle is in motion. The sloping or diagonally configured blade holds the flap lower at the outside edge. This diagonal configuration provides an improved support against bending moments throughout the entire cross-sectional area of the flap providing an integral "anti-sail" feature to the flap holder, resulting in improved spray control and highway safety. The integral channel of the flap, whether horizontally disposed or inclined, provides for minimal bulk as compared with prior art holders which typically employ a bolted joint between the flap and hanger and incorporate clamp metal clips employed with bolts to provide a friction grip. It is common over time for flaps to fail at the outside edge, where wind and vibration loads are highest. A stronger connection between the flap and holder, as provided by the present invention will provide for longer flap life. The relief channel connection provides a positive mechanical support, to assure a stronger connection of the flap to the holder.

Mud flaps suffer fatigue failure over time by flexing at their connections with the flap holder. Spring bar holders typically currently use three or more sheet metal clips that affix the flap with through-bolted connections. It is common in service for these flaps to fail at the outside edge, where wind loads and bending stresses are highest. The clip style connection concentrates the clamping forces into small areas of the flap material, which increase stresses and decrease fatigue life. Compared to current spring bar holders, the sloping style holder distributes contact forces over a much broader area of the flap—broader than current designs of spring bar holders with clips, and broader than spring loaded holders. The arrangement disclosed herein reduces stresses on the flap, and provides for longer flap life.

Referring now to FIGS. 8–10, another embodiment of the invention is illustrated. In this embodiment, the mud flap 40A is the same as that of the embodiment of FIGS. 6 and 7. There are, however, differences in the attachment bracket and the elongated support member components of the invention. More particularly, attachment bracket 70 in FIGS. 8–10 defines a slot 72 bounded on all four sides thereof. The slot 72 tapers inwardly as may perhaps best be seen with reference to FIG. 7 and accommodates a similarly tapered end 74 of elongated support member 14B. A notch 76 is formed in end 74. When the end 74 is fully seated in the slot 72, the notch 76 is located below a threaded aperture 78 formed in the attachment bracket 70. A lock screw 80 is utilized to secure the end 74 in place.

Figure 11:
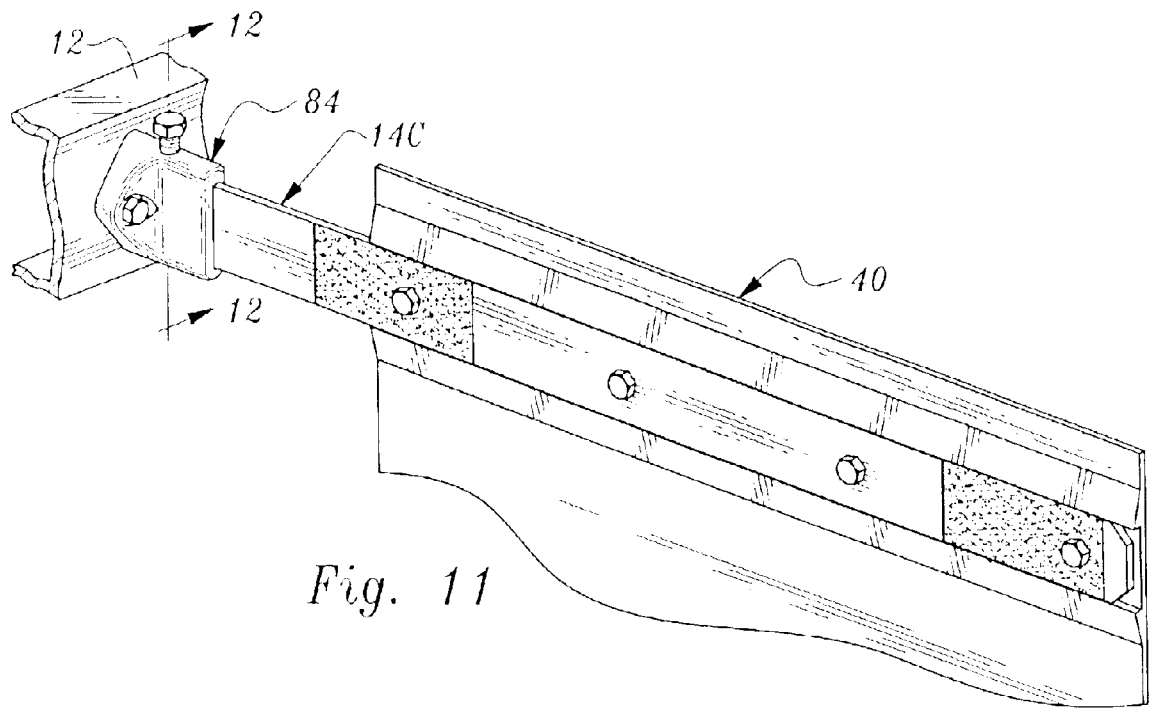
FIG. 11 is a perspective view of a fourth embodiment of the mud flap assembly of this invention.
Figure 12:
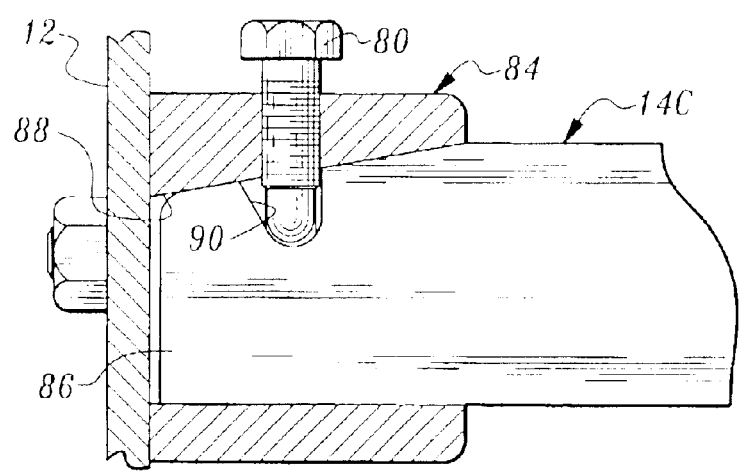
FIG. 12 is an enlarged, cross-sectional view taken along the line 12—12 in FIG. 11.

FIG. 11 and FIG. 12 illustrate a fourth embodiment of the invention. In this embodiment, the mud flap 40 is the same as that illustrated in FIGS. 1–5. Also, the connector support member 14C extends horizontally from its associated attachment bracket 84. End 86 of the member 14C is tapered as is the slot 88 of the attachment bracket. In this instance, the configurations of the tapers differ from those of the attachment bracket and connector support member in FIGS. 8–10 so that the elongated support member 14C extends straight out from the bracket. A notch 90 in the member 40C receives a lock screw 80 to maintain the elongated support member in place.

What is claimed is:

1. A mud flap assembly for attachment to trucks or other vehicles, said mud flap assembly comprising, in combination:

an attachment bracket for attaching the mud flap assembly to a vehicle;

an elongated support member of integral construction extending outwardly from said attachment bracket having a height substantially exceeding the thickness thereof and a length substantially exceeding the height thereof, said elongated support member having a first support member end connected to said attachment bracket and a second support member end, said second support member end being an unsupported distal end, with said elongated support member disposed in a vertical plane along the length thereof being substantially inflexible in up and down directions and flexible in forward and rearward directions along the length thereof between the attachment bracket and the distal end thereof, said unsupported distal end being free to move either forwardly or rearwardly upon flexing of said elongated support member and said first support member end fixed against movement relative to said attachment bracket in up, down, forward and rearward directions, said elongated support member having a substantially planar surface located between the attachment bracket and the distal end thereof for directly attaching a reflector tape thereto; and a mud flap fixedly attached to said elongated support member, supported by said elongated support member, and extending downwardly from said elongated support member, said mud flap flexing along with said elongated support member when said elongated support member flexes either forwardly or rearwardly, said mud flap disposed alongside and parallel to said elongated support member at the location of fixed attachment therebetween.

2. The mud flap assembly according to claim 1 wherein said mud flap is spaced from said attachment bracket.

3. The mud flap assembly according to claim 1 wherein said mud flap defines an elongated recess accommodating said elongated support member.

4. The mud flap assembly according to claim 3 wherein said mud flap includes two, spaced end walls, said elongated recess comprising a continuous channel extending between said two, spaced end walls.

5. The mud flap assembly according to claim 4 wherein said mud flap includes two spaced rib elements defining said continuous channel, each of said rib elements having a rib surface abuttingly engaging said elongated support member, one of said rib elements being disposed above said elongated support member and one of said rib elements being disposed below said elongated support member.

6. The mud flap assembly according to claim 4 wherein said channel is substantially horizontal.

7. The mud flap assembly according to claim 1 wherein said elongated support member extends substantially horizontally from said attachment bracket.

8. The mud flap assembly according to claim 1 wherein said attachment bracket is a metal casting.

9. The mud flap assembly according to claim 1 additionally comprising at least one mechanical fastener releasably connecting said first support member end to said attachment bracket.

10. The mud flap assembly according to claim 9 wherein said attachment bracket defines a slot receiving said first support member end, said attachment bracket and said first support member end defining holes, said at least one mechanical fastener comprising a threaded connector extending through the holes of the attachment bracket and first support member end and through said slot.

11. The mud flap assembly according to claim 9 wherein said attachment bracket defines a slot receiving said first support member end, said attachment bracket having an abutment surface adjoining said slot, said first support member end engaging said abutment surface.

12. The mud flap assembly according to claim 1 additionally comprising at least one mechanical fastener releasably attaching said mud flap to said elongated support member.

13. A mud flap for attachment to an elongated support member and support by said elongated support member, said mud flap having a flap top, a flap bottom, front and back flap sides and spaced flap end walls, said mud flap defining a recess for accommodating said elongated support member, said recess extending along one of said flap sides below said flap top and above said mud flap bottom between said flap end walls, said mud flap including at least one upper protrusion and at least one lower protrusion, said upper and lower protrusions being spaced from one another and defining said recess, each of said upper and lower protrusions having an abutment surface for abuttingly engaging said elongated support member at opposed locations on said elongated support member when said elongated support member is positioned in said recess and extends therealong, said mud flap defining openings communicating with said recess for accommodating mechanical fasteners employed to secure the mud flap to said elongated support member at said recess, said recess having a vertical dimension corresponding to a vertical dimension of said elongated support member whereby the abutment surfaces of said upper and lower protrusions are spaced from one another a distance equal to the vertical dimension of said elongated support member between said abutment surfaces and respectively simultaneously engage top and bottom surfaces of said elongated support member to strengthen and stabilize the interconnection between the mud flag and the elongated support member, said mud flap at said recess being free of tear lines and of sufficient thickness to resist tearing of said mud flat at said recess, said mud flap at said recess having an elongated support member engagement surface between said mud flap end walls and between said upper and lower protrusions for face to face engagement with said elongated support member when mechanical fasteners passing through said openings secure the mud flap to said elongated support member at said recess.

14. A mud flap assembly for attachment to trucks or other vehicles, said mud flap assembly comprising, in combination:

an attachment bracket for attaching the mud flap assembly to a vehicle;

an elongated support member of integral construction extending outwardly from said attachment bracket, said elongated support member having a first support member end affixed to said attachment bracket and a second support member end, said elongated support member being substantially inflexible in up and down directions and flexible in forward and rearward directions, said second support member end being free to move either forwardly or rearwardly upon flexing of said elongated support member; and a mud flap attached to said elongated support member, supported by said elongated support member, and extending downwardly from said elongated support member, said mud flap flexing along with said elongated support member when said elongated support member flexes either forwardly or rearwardly, said mud flap defining an elongated recess accommodating said elongated support member, said mud flap including two, spaced end walls, said elongated recess comprising a continuous channel extending between said two, spaced end walls and said mud flap further including two spaced rib elements defining said continuous channel, each of said rib elements having a rib surface abuttingly engaging said elongated support member, one of said rib elements being disposed above said elongated support member and one of said rib elements being disposed below said elongated support member.

15. A mud flap assembly for attachment to trucks or other vehicles, said mud flap assembly comprising, in combination:

an attachment bracket for attaching the mud flap assembly to a vehicle;

an elongated support member of integral construction extending outwardly from said attachment bracket, said elongated support member having a first support member end affixed to said attachment bracket and a second support member end, said elongated support member being substantially inflexible in up and down directions and flexible in forward and rearward directions, said second support member end being free to move either forwardly or rearwardly upon flexing of said elongated support member; and a mud flap attached to said elongated support member, supported by said elongated support member, and extending downwardly from said elongated support member, said mud flap flexing along with said elongated support member when said elongated support member flexes either forwardly or rearwardly; and at least one mechanical fastener releasably connecting said first support member end to said attachment bracket, said attachment bracket defining a slot receiving said first support member end, said attachment bracket and said first support member end defining holes, said at least one mechanical fastener comprising a threaded connector extending through the holes of the attachment bracket and first support member end and through said slot.

16. A mud flap assembly for attachment to trucks or other vehicles, said mud flap assembly comprising, in combination:

an attachment bracket for attaching the mud flap assembly to a vehicle;

an elongated support member of integral construction extending outwardly from said attachment bracket and having an elongated support member side wall, said elongated support member having a height substantially exceeding the width thereof and a top and bottom, a first support member end affixed to said attachment bracket and an unsupported second support member end, said elongated support member being substantially inflexible in up and down directions and flexible in forward and rearward directions, said second support member end being free to move either forwardly or rearwardly upon flexing of said elongated support member; and a mud flap attached to said elongated support member, supported by said elongated support member, disposed alongside said elongated support member and extending downwardly from said elongated support member, said mud flap flexing along with said elongated support member when said elongated support member flexes either forwardly or rearwardly, said mud flap including two spaced end walls and spaced top and bottom support engagement elements between said two spaced end walls, said top and bottom support engagement elements having abutment surfaces abuttingly engaging said elongated support member, at least one of said top support engagement elements being disposed above said elongated support member and at least one of said bottom support engagement elements being disposed below said elongated support member, said mud flap being in face to face engagement with said elongated support member side wall between said top and bottom support engagement elements.

17. A mud flap assembly for attachment to trucks or other vehicles, said mud flap assembly comprising, in combination:

an attachment bracket for fixedly attaching the mud flap assembly to a vehicle;

a two sided elongated support member of integral construction extending outwardly from said attachment bracket and having a height substantially greater than the thickness thereof, said elongated support member having a first support member end affixed to said attachment bracket and a second support member end, said elongated support member being substantially inflexible in up and down directions and flexible in forward and rearward directions, said second support member end being unsupported and free to move either forwardly or rearwardly upon flexing of said elongated support member;

a mud flap having front and back mud flap surfaces attached to said elongated support member, supported by said elongated support member, and disposed alongside said elongated support member with one of said front and back mud flap surfaces in face to face relationship with a side of said elongated support member and extending downwardly from said elongated support member, said mud flap having a recess accommodating said elongated support member and flexing along with said elongated support member when said elongated support member flexes either forwardly or rearwardly, said attachment bracket releasably receiving said first support member end;

first connector means operatively associated with said attachment bracket and first support member end to maintain said first support member end fixedly connected to said bracket; and second connector means operatively associated with said elongated support member and said mud flap to maintain said face to face relationship therebetween.

* * * * *